July 30, 1935.   S. S. MATTHES   2,009,781

CONDUCTOR AND SUPPORT GUARD

Filed Dec. 30, 1933

Inventor
SAMUEL S. MATTHES
By
Attorney

Patented July 30, 1935

2,009,781

UNITED STATES PATENT OFFICE 2,009,781

CONDUCTOR AND SUPPORT GUARD

Samuel S. Matthes, Mansfield, Ohio, assignor to The Ohio Brass Company, Mansfield, Ohio, a corporation of New Jersey Application December 30, 1933, Serial No. 704,720

8 Claims. (Cl. 191—43)

My invention relates to a guard or protector for trolley ears or clamps and trolley wires, although it may be employed with other devices.

The object of my invention is to reduce the wear and burning upon the lips of trolley ears, trolley clamps and the adjacent trolley wire due to arcing between the current collector and the trolley wire or the trolley wire support.

My invention resides in the new and novel construction, combination and relation of the various parts hereinafter described and shown in the drawing accompanying this specification.

In the drawing:—

Figure 1:
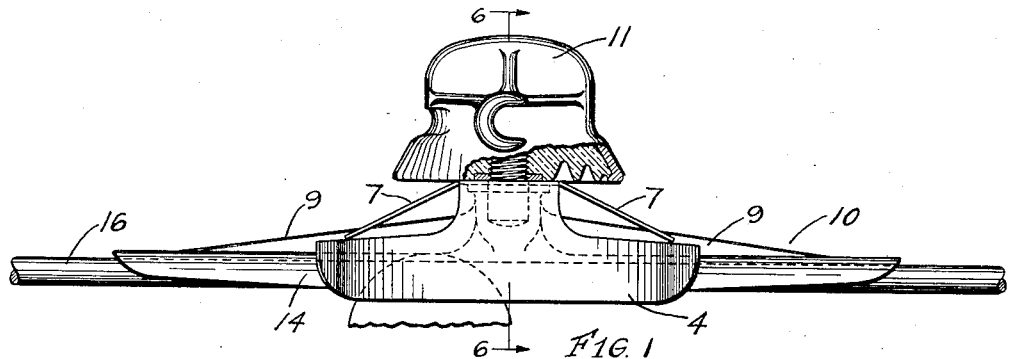
Fig. 1 is a side view in elevation of a trolley wire hanger, a trolley wire ear and my guard device.
Figures 2, 3:
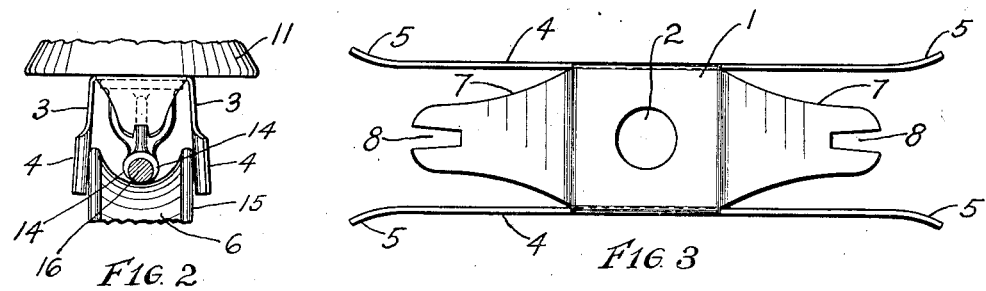
Fig. 2 is an end view of a portion of Fig. 1 to show the relation between the current collector and the other parts shown in Fig. 1.
Fig. 3 is a top view of the guard member or device only.
Figures 4, 5:
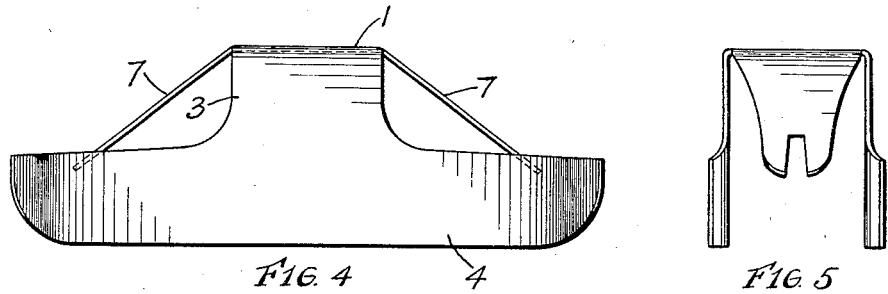
Fig. 4 is a side view in elevation of Fig. 3.
Fig. 5 is an end view of Fig. 4.
Figure 6:
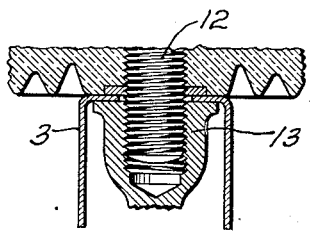
Fig. 6 is a section on the line 6—6 of Fig. 1 sufficient to show the relation between the hanger, ear and guard device.

In the preferred embodiment of my invention I prefer to make the same from sheet material, preferably hard drawn copper or bronze which will possess a considerable degree of resiliency to allow the side members to yield to pressure from the passing current collector.

The device comprises a supporting portion 1 provided with an opening 2 and downwardly projecting side members 3 which in turn are provided with elongated and longitudinally disposed contact members 4 which have their extreme ends curved outwardly as at 5 to insure the entrance of the current collector 6 when passing a point of support to which the guard or protector is attached.

Projecting in a longitudinal direction from the portion 1 are interlocking members 7, each provided with a slot 8 to engage with the web portion 9 of the trolley ear 10. The engagement of the members 7 with the webs 9 will prevent relative rotation of the guard device and the ear 10 or other support.

The guard device is usually employed at points where the trolley wire is supported by means of a trolley wire hanger 11 and the ear or trolley wire clamp 10 and these parts are usually held together by means of a threaded stud 12 secured in the hanger 11 and attached to the threaded boss 13. The guard member is held between the parts 10 and 11 and when these parts are tightly secured together the guard device is quite rigidly held in position, but due to constant movement, temperature changes and yielding of material, it may become loosened sufficiently to permit of its rotation out of position, but with the interlocking of the members 7 with the web 9 such rotation is prevented and the guard device maintains its predetermined relative position with respect to the ear regardless of how much the hanger 11 may rotate or loosen.

The opening 2 is made sufficiently large so that the guard may be slipped onto the stud 12.

When a current collector passes underneath a point where the trolley wire is supported there is usually considerable arcing at this point due to the changed conditions, that is, the passage of the current collector from the vertically yielding trolley wire to the more rigid or less yielding trolley ear and hanger which offers what is termed in the trade as a hard spot in the overhead construction. At such points the current collector is inclined to rebound and to make and break contact with the ear a number of times in passing across the same with the result that the lips 14 may be badly burned where they intermittently contact with the current collector 6 and thus materially reduce the life thereof.

The length of the contact members 4 may be whatever is required to take care of the conditions with respect to the ear or support with which it is used and may require being made the entire length of the ear or only part thereof.

The current collector, in passing across the ear or support 10, will enter between the contact members 4 which are spaced apart a distance less than the width of the current collector therefore the members 3 and 4 will yield to permit the passage of the collector 6 but will maintain a contact with the outer surface of the flanges 15. The members 4 will be in electrical connection with the trolley wire 16 and support 10 and therefore the guard device will act as a shunt for the passage of current while the collector engages the members 4 and therefore any tendency for arcing should the current collector break contact with the trolley wire or support while it is in contact with the members 4 will be materially reduced or entirely eliminated thus preventing or materially reducing the burning on the trolley wire or support.

The pressure of the side members 3 and 4 against the flanges 15 of the current collector will have a tendency to prevent the current collector breaking contact with the trolley wire 16 or support 10 as it passes through the guard device.

While I have shown a guard device made as a single piece stamped from sheet material, it may be made in several parts stamped from sheet material and riveted or welded together, also certain portions of it may be of cast material and other parts formed of sheet material secured thereto.

As those skilled in the art will readily recognize ways and means of modifying my invention, I wish to be limited only by my claims.

I claim:—

1. A guard for conductors and conductor supports comprising a support member, an orifice through the member, longitudinally projecting holding members extending from opposite sides of the support member, slotted means on each holding member to engage means on the guarded device to prevent relative movement of the device and guard about the axis of the orifice, downwardly projecting members from the support member and spaced from the said holding members and provided with elongated contact members positioned below the downwardly projecting members and each contact member extending in opposite longitudinal directions from its downwardly projecting member to engage the outer surface adjacent the periphery of the flanges on a current collector.

2. A guard for conductors and conductor supports comprising a support member, an orifice therethrough to receive a stud on a suspension device to support the conductor support, oppositely disposed and downwardly projecting contact members secured to the support member intermediate their ends, the contact members each having an elongated portion to be engaged by a flange on a current collector passing between the contact members, members projecting in a longitudinal direction from opposite sides of the support member and each having means to engage with a part of a conductor support positioned between the contact members and below the support member to hold the conductor support and guard against relative rotation.

3. A guard for conductors and conductor supports comprising a support member having means to receive means to secure the guard to a conductor support, downwardly projecting contact means from the ends of the support member, the contact means comprising elongated contact portions to be engaged by flanges on a current collector passing under the conductor support and means projecting from the support member in a longitudinal direction and provided with means to engage with the conductor support at a point between its end and center to prevent relative rotation of the guard and the conductor support.

4. A protector for attachment to a conductor support comprising a support member adapted to be secured to the conductor support, spaced and downwardly extending and elongated parts to be engaged on their inner faces by a moving current collector to conduct current from the conductor support to the current collector and means projecting from the support member and the said downwardly extending parts to support the said parts and means on and projecting from the support member to coact with means on the conductor support to prevent relative rotation of the protector and the conductor support.

5. A guard for attachment to a conductor support to prevent arcing between the support and a current collector if the collector breaks contact with the support comprising a pair of spaced and elongated members to be engaged along their inner surface by the current collector and having yielding means projecting from the members and electrically and mechanically connecting the same to secure the members to the conductor support and means projecting from aforesaid means to coact with means on the conductor support intermediate the center of the support and its ends to prevent relative rotation of the guard and the conductor support.

6. A guard for attachment to a conductor support to prevent arcing between the conductor support and a passing current collector comprising a pair of spaced and yielding elongated contact members to be engaged along their inner faces by the current collector, means connecting the contact members and arranged to secure the contact members to the support and means projecting from the aforesaid means to engage with means on the support to hold the guard and support against relative rotation.

7. A guard for attachment to a conductor support to prevent arcing between the conductor support and a passing current collector comprising a pair of spaced and yielding elongated contact members to be engaged along their inner faces by the current collector, means projecting from each contact member intermediate their ends and connecting the contact members to secure the contact members to the support and yielding means to engage with means on the support to hold the guard and support against relative rotation.

8. In combination, a conductor support having lips substantially encircling the conductor, a pair of spaced and downwardly extending contact members between which a current collector may pass and arranged to contact with the flanges on the current collector as it passes across the support without interfering with its contact with the lips of the support, means to secure the contact members to the support at a point intermediate the ends of the support and means to cooperate with means on the support at a point intermediate the aforesaid point and the end of the support to prevent relative rotation of the support and contact members.

SAMUEL S. MATTHES.